INVENTORS
George C. Sziklai and
Francis J. Darke, Jr.
By [signature]
ATTORNEY

INVENTORS
George C. Sziklai and
Francis J. Darke, Jr.
By [signature]
ATTORNEY

Aug. 10, 1954 G. C. SZIKLAI ET AL 2,686,220

CONVEYANCE OF AUXILIARY INFORMATION IN A TELEVISION SYSTEM

Filed May 28, 1948 3 Sheets-Sheet 3

INVENTORS
George C. Sziklai and
Francis J. Darke, Jr.
By [signature]
ATTORNEY

Patented Aug. 10, 1954

2,686,220

UNITED STATES PATENT OFFICE 2,686,220

CONVEYANCE OF AUXILIARY INFORMATION IN A TELEVISION SYSTEM

George C. Sziklai and Francis J. Darke, Jr., Princeton, N. J., assignors to Radio Corporation of America, a corporation of Delaware Application May 28, 1948, Serial No. 29,796

13 Claims. (Cl. 178—5.6)

This invention relates to television and more particularly to a method and arrangement for transmission of auxiliary information during the blanking interval of a video signal.

Proposals have been made that the sound accompaniment for television may be transmitted by modulation of the picture carrier during the line blanking intervals when no picture detail is transmitted. Improved reception of picture and sound, decreased investment in receivers and transmitters, and greater channel width for the picture signal are mentioned as possibilities of a "duplex" transmission of picture and sound.

One such proposal for the utilization of the blanking time intervals for the transmission of associated audio information is described by H. E. Kallmann in an article entitled "Audio and Video on a Single Carrier," beginning on page 39 of "Electronics" for May, 1941.

There are also numerous U. S. patents relating to the utilization of some part of the blanking interval for sound transmission. Some of the more pertinent patents are listed below:

2,061,734—R. D. Kell; 2,089,639—A. V. Bedford; 2,227,108—H. A. Rosenstein; 2,257,562—H. Branson.

According to this invention, advantage is taken of the duplexing possibilities in television systems to convey auxiliary information which may take the form of an auxiliary image which, although not having the detail expected in the principal television image, has sufficient detail to permit the conveyance of useful information such as the time, station identification, advertising matter, weather reports, scores on sporting events, news briefs, etc. This is accomplished by amplitude modulating the blanking impulses and inverting the signal applied to the image reproducing tube in order to blank out the principal image and show only the auxiliary image during the retrace time interval by the scanning beam upon its retrace.

A primary object of this invention is to provide an improved television system.

Another object of this invention is to provide for the transmission of auxiliary information without increasing channel width of present television systems.

Another object of this invention is to transmit selectable auxiliary information without necessitating the addition of expensive equipment in the receiving station.

Other and incidental objects of the invention will be apparent to those skilled in the art from a reading of the following specification and an inspection of the accompanying drawing in which.

Figure 1:
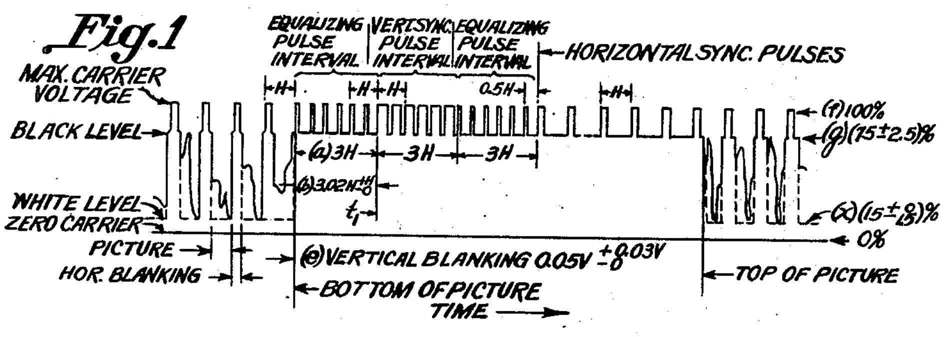
Figure 1 illustrates graphically the present standard television signal.

Turning now in more detail to Figure 1, a complete video signal is illustrated with appropriate designations.

The form is taken from the RMA standard T-111 television signal as defined by the RMA Television Committee.

Figure 2:
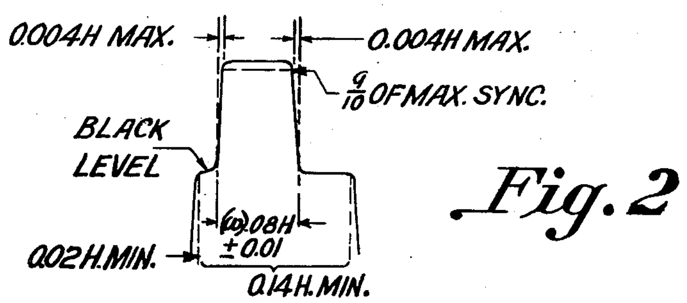
Figure 2 shows an enlarged portion of the blanking and synchronizing pulse of the present standard television signal.

If the curve of Figure 1 is studied in connection with the enlarged portion illustrated in Figure 2, it will be seen that a large portion of the time is devoted to blanking pulse time intervals during which time normally no visual information is transmitted. It will be seen that the time interval "H" designates a complete scanning line with its flyback interval, and by reference to Figure 2 it will be seen that 14% of the time is utilized during this blanking time interval.

Figure 3:
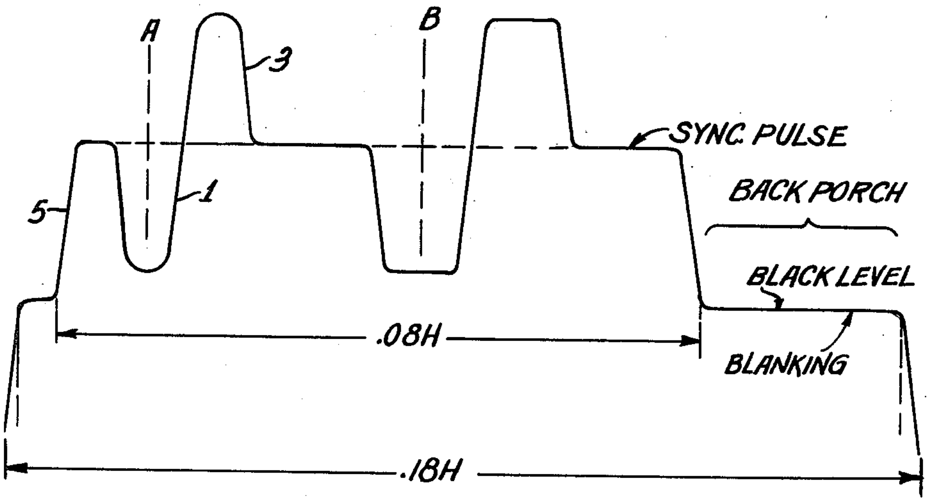
Figure 3 illustrates graphically the modulation of a synchronizing pulse of a television system in accordance with one form of this invention.

The modulation with auxiliary information according to one form of this invention is illustrated in Figure 3, in which the blanking interval including the synchronizing pulse is broadened to show in more detail the modulation of the synchronizing pulse in a manner which does not change the integrated power of the synchronizing pulse.

Let it be assumed, for example, that the auxiliary image information to be transmitted contains a black line at position "A" in the return trace. The modulation of the synchronizing pulse of Figure 3 is so polarized that there will be a downward modulation as indicated by the portion of the curve 1. It will be seen from a brief examination of Figure 1 that in the principal image, the downward modulation is an indication of white, while an upward swing is an indication of black in the image. It will be seen, therefore, that according to this invention in one of its forms, the opposite is true, that a downward modulation in the blanking interval is representative of a black direction. The reason for this will be explained below in connection with the description of the television receivers.

It is important to notice that the portion of the curve 1 is followed by its counterpart 3 in order that the total energy of the synchronizing pulse is not distinguishable.

It will also be seen that the front edge 5 of the synchronizing pulse is not interfered with. This latter permits accurate scanning and provides that no modulation in accordance with this invention will interfere with proper timing of the scanning operation.

If the black element of the auxiliary image information is wider than in the case of time "A," a broader curve such as illustrated at "B" will be formed.

Figure 7:
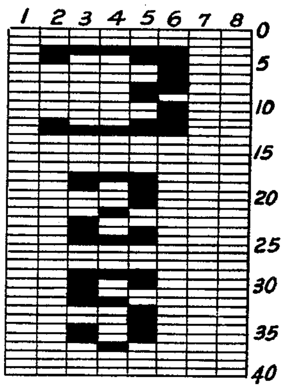
Figure 7 illustrates graphically typical information which may be conveyed by the practice of this invention.

It will be appreciated, however, that due to the speed of the retrace with respect to the speed of the trace, the detail in the horizontal direction will not be sufficient to transmit as an auxiliary image any information which requires as fine a detail as is included in the principal image. The detail in the horizontal direction, however, will bear the same relation to the detail in the horizontal direction of the image as does the retrace rate to the scanning rate. A great deal of information can be transmitted, even with reduced detail, in a horizontal direction, as illustrated in Figure 7 below. In this connection it is assumed, for example, that no additional band width is required and that the detail of the auxiliary image in a horizontal direction will be limited to present standards of band width.

Figures 4, 5:
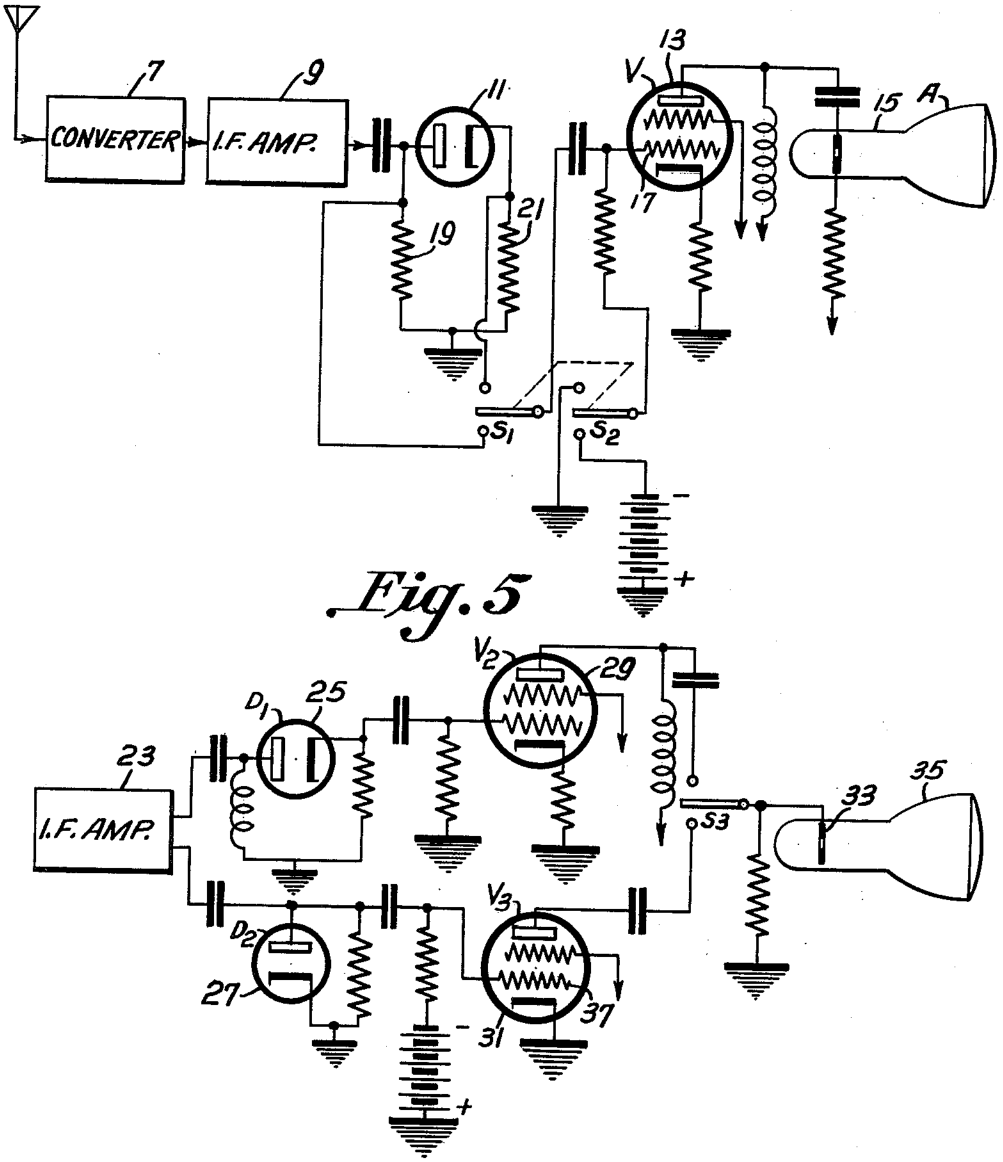
Figure 4 illustrates by block and circuit diagram one form of this invention as applied to a receiving system.
Figure 5 shows by block and circuit diagram another form of this invention as applied to a receiving system.

Turning now to Figure 4, there is shown a television receiver modified in a manner such as to permit the reviewer to receive the auxiliary image information at any time he desires to do so. This is accomplished by a simple modification of any of the standard type television receivers, such as, for example, the one shown and described in detail by Antony Wright in an article entitled "Television Receivers," beginning on page 5 of the "RCA Review" for March 1947.

The converter 7 indicated by block in Figure 4 and the intermediate frequency amplifier 9 also indicated by block in Figure 4 may be of the type emeployed in the receiver described in the above identified article. Likewise, the diode second detector 11 and the amplifier tube 13, as well as the image reproducing tube 15, may also be of the usual type employed in broadcast receivers.

Although not shown, the image reproducing tube 15 includes the usual electron beam forming gun, accelerating electrodes and associated deflection elements such as deflecting coils.

Switches $S_1$ and $S_2$ are mechanically ganged together for ease of operation. In the upward position of switches $S_1$ and $S_2$, the system operates in the manner described for normal television receiver operation. That is, the tube 15 will be blanked out during retrace time intervals.

When switches $S_1$ and $S_2$ are placed in the lower position, however, the polarity of the video signal applied to the control electrode 17 of tube 13 will be in an opposite direction to that applied to the control electrode 17 during normal operation. This will be understood when the circuits involving the diode 11, together with its associated resistors 19 and 21, are examined.

It is desirable that at the time of inverting the video signal applied to the tube 15, the level be changed in order that the auxiliary image information will have the proper reference level. This is accomplished by selection of proper bias for the control electrode 17 of tube 13. The reason for selection of proper bias will be understood upon a brief reference to Figure 3. If, for example, the bias is selected so that the black level of the tube 15 will be established at the blanking pedestal, the portion of the curve 1 of Figure 3 will show up as a black line on the screen of image reproducing tube 15 of Figure 4. The portion 3 of the curve of Figure 3 will be white. The associated image signal adjacent the blanking pulse of Figure 1, upon inversion, will be in the blacker than black region and therefore not show up on the screen of tube 15.

Turning now in detail to Figure 5, there is shown another form of receiving arrangement suitable for the reproduction of auxiliary image information.

The intermediate frequency amplifier 23 may also take the form of the intermediate frequency amplifier shown and described in the "RCA Review" article referred to above. In this form of the invention, a pair of detectors 25 and 27 are employed, as well as a pair of amplifying tubes 29 and 31.

The upper section including diode 25 and tube 29 is arranged in accordance with the usual practice, which provides the control electrode 33 of image tube 35 with a video signal to produce the principal image on the screen of tube 35.

However, when the switch $S_3$ is moved to the lower position, the diode 27 inverts the incoming signal to produce an inverted signal on control electrode 33 of tube 35. The appropriate bias is applied to the control electrode 37 of tube 31 to properly clip the undesired signals.

Figure 6:
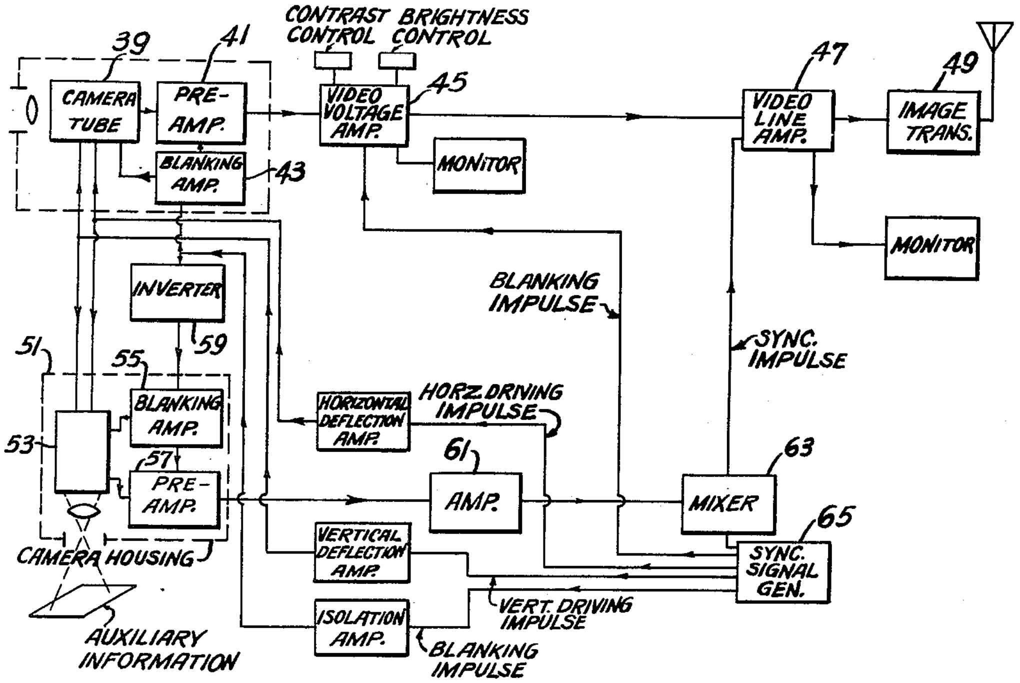
Figure 6 shows by block diagram a suitable transmitter arrangement for transmitting auxiliary information in accordance with this invention.

Turning now to Figure 6, there is shown a suitable transmission system for forming auxiliary image signal information in accordance with this invention.

The details of Figure 6 are omitted in view of the fact that their elements, as well as their operation, are well described in the television art, such as, for example, the textbook by Donald G. Fink entitled "Principles of Television Engineering," published in 1940 by the McGraw Hill Book Co., Inc.

The principal image is picked up by the camera tube 39 of the camera housing illustrated by block and including the preamplifier 41, together with the associated blanking amplifier 43.

The blanking amplifier in providing its usual function blanks the camera tube 39 during blanking periods so that no image signal is transmitted by camera 39 during the blanking period. The video voltage amplifier 45 and the video line amplifier 47 amplify the video signal for the image transmitter 49 in the usual manner.

The normal transmitter is modified in order to perform the functions required for the transmission of auxiliary image information during blanking intervals by the provision of a second camera 51, also including a camera tube 53, a blanking amplifier 55 and a preamplifier 57.

It will be seen, however, that the energy furnished the blanking amplifier 55 is inverted to that furnished blanking amplifier 43 by an inverter 59. It will be seen that the function of the inverter 59 will cause camera 53 to be operative only during the blanking time intervals.

The image signal formed during the blanking intervals by camera 51 will be transmitted to an amplifier 61 and thence to a mixer 63 which is arranged to combine the signal in proper polarity with the sync impulse in the manner shown graphically in Figure 2 above. The mixer 63 is inserted in the sync impulse line between the sync signal generator 65 and the video line amplifier 47.

According to another form of this invention, mixer 63 is placed in the blanking impulse line connecting sync signal generator 65 and video voltage amplifier 45.

Turning now to Figure 7, there is shown graphically the appearance of the auxiliary information which may, for example, take the form of the information regarding the time. It will be seen that even though the horizontal detail is not as good as the principal image, it is sufficient to convey valuable information. It will be appreciated that the detail in the vertical direction will be equal to that of the principal image, so it is therefore desirable that the auxiliary information be so arranged that a utilization of maximum detail available can be had.

Although the invention in one of its forms was described in detail, it will be appreciated that auxiliary information may also be transmitted during a blanking interval on the "back porch," as designated in Figure 2. It may also be transmitted with the same polarity as that of the associated image signal, in which case it will only be necessary at the receiver to increase the brightness control to obtain a super-positioning of the auxiliary information on the principal image.

It is also possible, according to another form of this invention, to provide a clipping action in the receiver wherein the auxiliary information is transmitted with the same polarity as the principal image, and that all whites above a certain predetermined level are clipped, and that the auxiliary information will consist of modulation in a black direction.

Having thus described the invention, what is claimed is:

1. The method of conveying auxiliary visual information in a television system of the type employing an image reproducing tube arranged to receive image signals with associated blanking impulses comprising the steps of developing an image signal, an auxiliary image signal, and blanking impulses, amplitude modulating said blanking impulses with said auxiliary image signal, reversing the polarity of said modulated blanking impulses with respect to said image signals, and developing a light image from said modulated blanking impulses.

2. The method of conveying auxiliary video information in a television system of the type employing an image reproducing tube arranged to receive image signals with associated blanking impulses and synchronizing pulses comprising the steps of developing image signals, blanking impulses, synchronizing pulses, and an auxiliary image signal representative of said auxiliary information, amplitude modulating said blanking impulses and synchronizing pulses with said auxiliary image signal, reversing the polarity of the auxiliary image signals with respect to said image signals and developing an image from the reversed auxiliary image signals.

3. The method of conveying auxiliary image information in a television system of the type employing an image reproducing tube arranged to receive image signals with associated line blanking impulses and synchronizing pulses comprising the steps of developing an auxiliary image signal representative of said auxiliary information, amplitude modulating said synchronizing pulses with said auxiliary image signal, applied to the image reproducing tube and reversing the polarity of the auxiliary image signals applied to the image reproducing tube an odd number of times different from the number of times the signal is reversed during the operation with said image signal.

4. The method of conveying auxiliary visual information in a television system of the type employing an image reproducing tube arranged to receive image signals with associated blanking impulses and synchronizing pulses comprising the steps of developing an auxiliary image signal representative of said auxiliary information, amplitude modulating said synchronizing pulses with said auxiliary image signal in a light polarization opposite to the associated image signal modulation, reversing the polarity of said image signals and modulated blanking impulses with respect to the polarity of the image signals normally applied to the image reproducing tube, and applying the reversed polarity image signals and blanking impulses to said image reproducing tube.

5. The method of receiving auxiliary image information during line-blanking intervals in a television system of the type employing an image reproducing tube arranged to receive image signals with associated blanking impulses comprising the steps of developing an auxiliary image signal during line-blanking intervals, said auxiliary image signal having a polarity reversed with respect to the polarity of said image signals, and inverting the signal applied to said image reproducing tube with respect to the polarity of the signal applied during operation of the principal image.

6. The method of receiving auxiliary image information during line-blanking intervals in a television system of the type employing an image reproducing tube arranged to receive image signals with associated blanking impulses comprising the steps of developing an auxiliary image signal during line-blanking intervals, said auxiliary image signal having a polarity reversed with respect to the polarity of said image signals, applying the reversed auxiliary image signal to said image reproducing tube in place of said image signal, and re-establishing the black reference level with appropriate bias potential.

7. In a television system of the type employing an image reproducing tube arranged to receive image signals with associated blanking impulses, an arrangement for conveying auxiliary information comprising in combination a television camera for developing an auxiliary image signal, a geneartor for forming blanking impulses, an electrical connection between said generator and said camera to modulate said blanking impulses with said auxiliary image signal in a polarity opposite to the associated image signal modulation, an image reproducing tube, signal detecting and amplifying circuit, a first source of signals in said signal detecting and amplifying circuit, a second source of signals in said signal detecting and amplifying circuit whose signal polarity is opposite to the signal polarity of the signals of said first source of signals, a switch connected serially in said detecting and amplifying circuit and following said sources of signals, said switch selectively connected to one or the other of said sources.

8. In a television system of the type employing an image reproducing tube arranged to receive image signals with associated synchronizing pulses, means for conveying an auxiliary image comprising in combination a television camera for developing an auxiliary image signal, a generator for forming synchronizing pulses, an electrical connection between said generator and said camera to modulate said synchronizing pulses with said auxiliary image signal in a polarity opposite to the associated image signal modulation, a mixer for combining the modulated synchronizing pulses with said image signals, a brightness control electrode for said image reproducing tube, and means for manually selecting the polarity of said image signals and modulated synchronizing pulses applied to said brightness control electrode.

9. In a television system of the type employing an image reproducing tube having a brightness control electrode, an arrangement for conveying auxiliary visual information comprising in combination means for developing an image signal, means for developing an auxiliary image signal, a generator for forming blanking impulses and synchronizing pulses, means to modulate said synchronizing pulses with said auxiliary image signal, a mixer for combining the modulated blanking impulses with said image signals, and selective means for applying the mixed modulated blanking impulses and image signals to said brightness control electrode such that said blanking impulses increase in a positive direction.

10. In a television system of the type employing an image reproducing tube having a brightness control electrode and arranged to receive thereon a video signal including image signals with associated blanking impulses and synchronizing pulses, an arrangement for conveying auxiliary visual information comprising in combination means for developing an auxiliary image signal, a generator for fomring blanking impulses containing synchronizing pulses, an electrical modulation connection between said auxiliary image signal developing means and said generator to modulate said synchronizing pulses with said auxiliary image signal, a mixer for combining the modulated blanking impulses with said image signals, a detector for said image signal and modulated blanking impulses, said detector having a push-pull output circuit, a switch for selecting one or the other side of said push-pull output circuit, and an amplifier connected between said control electrode and said switch.

11. A television system for receiving auxiliary visual information during line blanking intervals comprising in combination a detector for demodulating a carrier, an image reproducing tube, an amplifier connected between said detector and said image reproducing tube, a switch for reversing signal polarity connected in the circuit involving said detector, amplifier and image reproducing tube, a second switch switchably connected between said amplifier and two different bias setting arrangements to establish predetermined reference light levels for said image reproducing tube, and a mechanical connection between said two switches.

12. A television receiver comprising in combination an image reproducing tube, signal detecting and amplifying circuit, a first source of image signals in said signal detecting and amplifying circuit, a second source of image signals in said signal detecting and amplifying circuit whose white and black signal polarity is substantially one hundred and eighty degrees out of phase with the signals of said first source of signals, a switch connected serially in said detecting and amplifying circuit and following said sources of signals, said switch selectively connected to one or the other of said sources.

13. A television receiver comprising in combination an image reproducing tube, signal detecting and amplifying circuit, a first source of image signals in said signal detecting and amplifying circuit, a second source of image signals in said signal detecting and amplifying circuit whose black and white representative signal polarity is substantially one hundred and eighty degrees out of phase with the signals of said first source of signals, and wherein said sources occur sequentially with each other, a switch connected serially in said detecting and amplifying circuit and following said sources of signals, said switch selectively connected to one or the other of said sources, two different electrical bias sources, a second switch selectively connected between one or the other of said bias sources and said signal detecting and amplifying circuit, and a mechanical connection between said two switches.

References Cited in the file of this patent

UNITED STATES PATENTS

| Number | Name | Date |
|---|---|---|
| 1,817,502 | Zworykin | Aug. 4, 1931 |
| 2,146,876 | Zworykin | Feb. 14, 1939 |
| 2,150,551 | Kemp | Mar. 14, 1939 |
| 2,201,309 | Goldsmith | May 21, 1940 |
| 2,257,562 | Branson | Sept. 30, 1941 |
| 2,262,942 | Jones | Nov. 18, 1941 |
| 2,299,083 | Elm | Oct. 20, 1942 |
| 2,303,968 | White | Dec. 1, 1942 |
| 2,320,699 | Homrighous | June 1, 1943 |
| 2,417,446 | Reynolds | Mar. 18, 1947 |
| 2,550,821 | Kharbanda | May 1, 1951 |
| 2,563,684 | Lord | Aug. 7, 1951 |

OTHER REFERENCES

"Proceedings British IRE," July 1946, pp. 251–273.